United States Patent
Hewson et al.

(10) Patent No.: US 6,239,082 B1
(45) Date of Patent: *May 29, 2001

(54) PETROLEUM QUENCH OIL

(75) Inventors: William Donald Hewson, Sarnia; Gerald Keith Gerow, Brights Grove, both of (CA)

(73) Assignee: Exxon Research and Engineering Company, Annandale, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,825

(22) Filed: Apr. 3, 1998

(51) Int. Cl.[7] ............... C10M 127/00; C10M 129/92; B23K 35/24
(52) U.S. Cl. ............. 508/287; 508/506; 508/591; 148/29
(58) Field of Search .................. 508/287, 506, 508/591; 148/29; 72/42

(56) References Cited

U.S. PATENT DOCUMENTS

| | | | |
|---|---|---|---|
| 2,340,724 | * 2/1944 | Horst | 148/29 |
| 3,489,619 | 1/1970 | Brewster | 148/29 |
| 3,567,640 | 3/1971 | Stroh | 252/59 |
| 3,855,014 | * 12/1974 | De Vries et al. | 148/29 |
| 5,250,122 | * 10/1993 | Uchida et al. | 148/29 |
| 5,376,186 | * 12/1994 | Uchida et al. | 148/29 |

FOREIGN PATENT DOCUMENTS

| | | | |
|---|---|---|---|
| 178354 | * | 4/1986 | (EP) . |
| 60-04597 | * | 1/1985 | (JP) . |
| 61-268794 | * | 11/1986 | (JP) . |

* cited by examiner

*Primary Examiner*—Margaret Medley
*Assistant Examiner*—Cephia D. Toomer
(74) *Attorney, Agent, or Firm*—Joseph J. Allocca

(57) ABSTRACT

Petroleum quench oils effective for high speed cooling of heated metals and metal hardening are disclosed. The petroleum quench oils contain natural or synthetic base oils having a minimum flash point of about 120° C. and a combination of poly(iso)alkylene and poly(iso)alkylene succinic anhydride or succinic acid. A method for cooling heated metal to harden it, improve the metallurgical consistency, improve machinability and reduce residue on quenched metal parts is also disclosed comprising quenching the heated metal part in a quench oil containing natural or synthetic base oils having a minimum flash point of about 120° C. and a combination of poly(iso)alkylene and poly(iso)alkylene succinic anhydride or succinic acid.

9 Claims, No Drawings

PETROLEUM QUENCH OIL

FIELD OF INVENTION

The present invention relates to quench oils used in the heat treatment of metals, especially steel.

BACKGROUND OF INVENTION

Petroleum oils used in the rapid cooling of heated metals such as steel often include quench speed accelerators. In use, the oil and accelerators generally thermally decompose. Some result in the formation of sludge which gives a poor appearance to the metal part and requires replenishing the oil. Thus, there is a need for improved quench oils that are highly detergent and highly stable.

SUMMARY OF INVENTION

It now has been discovered that a unique combination of quench speed accelerators in a base quench oil when used for rapid cooling of heated metal parts results in parts that not only have improved appearance but also improved metallugical consistency such as hardness and machineability. Thus, in one embodiment there is provided a quench oil for high speed cooling of heated metals comprising a major amount of a base oil having a minimum flash point of about 120° C. and a quench rate acceleration amount of an additive containing (a) a polymer or copolymer having alkylene groups, and (b) a succinic acid or succinic anhydride functionalized polymers and copolymers having alkylene groups.

This and other embodiments will become apparent from a reading of the detailed description which follows:

DETAILED DESCRIPTION OF INVENTION

The quench oil of the present invention comprises a base quench oil which may be any natural or synthetic oil that has a minimum flash point of about 120° C. Especially useful are solvent refined or hydrotreated petroleum base stocks having a viscosity between 5 and 100 cSt at 40° C. Illustrative of such a base oil is one sold by Imperial Oil of Canada as IOL 100N20 and which is a solvent refined paraffinic base stock.

The quench oil also includes a quench speed accelerator additive system containing (a) a polymer or copolymer having alkylene groups and (b) a succinic acid or succinic anhydride functionalized polymer or copolymer having alkylene groups.

Component (a) above may be any alkylene containing polymer or copolymer that thermally decomposes cleanly at high temperatures. Examples of such polymers include poly(iso)alkylenes and copolymers thereof with styrene. In general these polymers will have a number average (Mn) molecular weight in the range of about 300 to greater than 5000, and preferably about 2500. Especially preferred is poly(iso)butylene.

Component (b) may be any succinic acid or succinic anhydride functionalized alkylene containing polymer or copolymer that decomposes cleanly at high temperatures. Among the functionalized polymers and copolymers are functionalized poly(iso) alkylenes and functionalized copolymers of (iso)alkylenes and styrene. Generally polymers with a Mn of from about 300 to 3000 and higher are useful with molecular weight in the range of 900 to 1300 being preferred. Especially preferred is poly(iso)butylene succinic anhydride and poly(iso)butylene succinic acid.

Components (a) and (b) are added to the base oil in an amount sufficient to accelerate the quench speed of the base oil. Preferably components (a) and (b) are added in an amount sufficient to provide an "IVF quench speed" of about 9 seconds or faster. The IVF quench speed is the time it takes to cool a probe heated to 850° C. to 500° C. Typically component (a) will be used in amounts from about 1.5 to about 12 vol % based on the total volume of the composition and preferably from about 4.5 to 7.5 vol %. Component (b) will be used in amounts of from about 0.05 vol % to about 4.5 vol % and preferably from 0.5 to about 1.5 vol %, based on the total volume of the composition. The ratio of (a):(b) will be in the range of about 0.25 to about 150.

As will be appreciated, components (a) and (b) may be contained in a liquid carrier. Nonetheless, the amounts referred to above are the actual amounts of the components added to the base oil.

EXAMPLES

Example 1

A quench oil was prepared by adding to 100N20 base stock 6 vol % of a poly(iso)butylene having a molecular weight of 2500 and 1.1 vol % of a poly(iso)butylene succinic anhydride having a molecular weight of 1050. The quench oil composition had a flash point of 199° C. and a viscosity of 38.07 cSt at 40° C. The quench oil was subjected to the IVF quench speed test and found to have a quench speed of 8.7 seconds.

Example 2

The quench oil prepared in Example 1 was tested in quenching heated steel parts. In all instances the parts quenched were very clean. Indeed no extra cleaning of the parts were required whereas other commercial quench oils resulted in about 5% to 20% of the parts to be rejected. Additionally, the parts treated as per this example had improved consistency of hardness; and finally the parts had improved machinability as demonstrated by a significantly greater number of parts cut before tool changes were required.

What is claimed is:

1. A quench oil comprising:
    a major amount of a base oil having a minimum flash point of 120° C.; and
    a quench rate accelerating amount of an additive system containing
    (a) a polymer selected from the group consisting of poly(iso)alkylenes and copolymers of poly(iso)alkylenes with styrene, and
    (b) succinic acid or succinic anhydride functionalized polymers or copolymers having alkylene groups, the volume ratio of (a):(b) being about 0.25 to about 150.

2. The quench oil of claim 1 wherein the amount of additive is sufficient to provide an IVF quench speed of about 9 seconds.

3. The quench oil of claim 2 wherein the polymer or copolymer (a) has a molecular weight in the range of about 300 to 5000.

4. The quench oil of claim 3 wherein the functionalization polymer or copolymer (b) has a molecular weight in the range of about 300 to 3000.

5. The quench oil of claim 4 wherein the polymer (a) is a poly(iso)alkylene and the functionalized polymer (b) is a poly(iso)alkylene succinic anhydride.

6. The quench oil of claim 5 wherein the poly(iso)alkylene is poly(iso)butylene.

7. A quench oil comprising:

a major amount of a base oil having a minimum flash point of about 120° C.;

from about 1.5 to about 12 vol % of a poly(iso)alkylene having a molecular weight of from 300 to 5000, and from 0.05 to 4.5 vol % of a succinic anhydride or succinic acid functionalized poly(iso)alkylene having a molecular weight of 300 to 3000.

8. In the method of rapidly cooling a heated metal part by contacting the part with a quench oil containing a quench speed accelerator, the improvement comprising contacting the part with a quench oil containing a quench speed accelerator additive system containing (a) a polymer selected from the group consisting of poly(iso)alkylenes and copolymers of poly(iso)alkylene with styrene, and (b) and succinic acid or succinic anhydride functionalized polymers or copolymers having alkylene groups, the volume ratio of (a):(b) being about 0.25 to about 150.

9. The improvement of claim 8 wherein the additive is present in an amount sufficient to provide an IVF quench speed of about 9 seconds.

* * * * *